Aug. 19, 1924.
W. P. HEATH
1,505,343
METHOD OF DETERMINING THE VOLUME OF OCCLUDED GAS IN A PLASTIC MASS
Filed Oct. 28, 1922
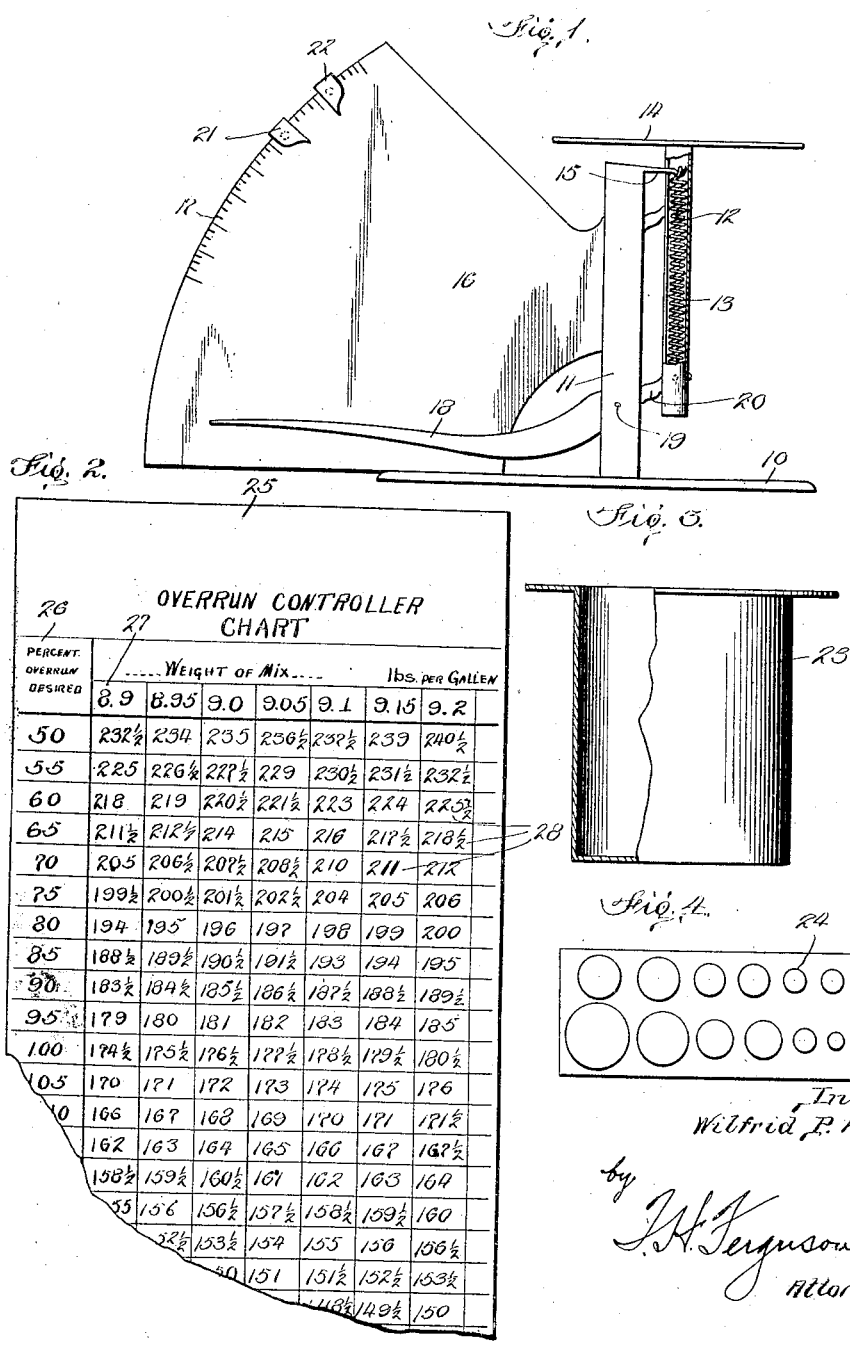

Patented Aug. 19, 1924.

1,505,343

UNITED STATES PATENT OFFICE.

WILFRID P. HEATH, OF CHICAGO, ILLINOIS, ASSIGNOR TO MOJONNIER BROS. CO., OF CHICAGO, ILLINOIS, A CORPORATION OF ILLINOIS.

MEANS FOR DETERMINING THE VOLUME OF OCCLUDED GAS IN A PLASTIC MASS.

Application filed October 28, 1922. Serial No. 597,522.

*To all whom it may concern:*

Be it known that I, WILFRID P. HEATH, a citizen of the United States, residing at Chicago, in the county of Cook and State of Illinois, have invented certain new and useful Improvements in Means for Determining the Volume of Occluded Gas in a Plastic Mass, of which the following is a specification, reference being had to the accompanying drawings.

This invention relates to weighing devices, and more particularly to a weighing scale peculiarly adapted to be used in connection with my method of determining the number of volumes of occluded gas imprisoned within a predetermined volume of plastic matrix, such as ice cream, candy nougat, facial pomades, marshmallow, sherbets, ices, butter and a large number of other plastic materials of the same character in which gas or air is occluded by beating or whipping.

In order that the object of the invention may be more thoroughly understood, it is best to refer to a specific example of the use of the scale. Therefore, I will refer to the process of making ice cream as illustrative of the problem which I desire to solve.

In the manufacture of ice cream, the freezing operator desires to draw his ice cream from the freezer at a definite "overrun" percentage, that is to say, if he desires that one hundred gallons of plastic mix, that is one hundred gallons of mixed cream, sugar, flavoring extract, gelatin, etc., shall make one hundred and ninety gallons of ice cream after being frozen, the percentage of desired overrun or yield is ninety. If then he is freezing a mixture weighing a certain number of pounds to the gallon, he knows, by reference to the percentage or scale card to be hereinafter described, that a certain definite amount of this mix, after being frozen, should weigh a certain predetermined amount in order to secure the overrun which he desires. He, therefore, generally speaking, weighs this predetermined amount and if the weight of this predetermined amount is equal to that indicated on the scale card for a certain overrun, he knows that the ice cream has been taken sufficiently to secure a predetermined amount of occluded gas. If, on the other hand, this predetermined amount of ice cream weighs more than what it should according to the card, it indicates the ice cream is too heavy in weight and needs additional beating. If, however, it weighs less than the predetermined amount indicated on the card, then it indicates that the ice cream is too light and the yield or "swell" needs to be beaten out until the predetermined amount of ice cream subsequently tested shows a weight equal to that indicated on the card for that particular overrun percentage. What is true of ice cream is also true of other plastic mixes, such as candy nougat freshly made and slightly mobile and plastic, marshmallow, likewise plastic when freshly made, facial pomades which are agitated to occlude approximately an even volume of bubbles with basic matrix, sherbets, ices, butter, 10% of which is occluded gas, etc.

With these facts in mind, the object of the present invention is to provide a weighing device of a very simple construction in which adjustable means are provided for indicating the degree to which the pointer of the scale or weighing device should move when a predetermined volume of mix with the occluded gases has been placed upon the weighing scale.

A further object is to provide a weighing device of this character with an adjustable indicator, a cup of predetermined cubical content, a set of weights adapted to be disposed within the cup, and a scale card whereby weights of a predetermined amount may be placed within the cup and placed upon the scale to thus shift the pointer of the weighing machine, the indicator being then shifted and set with relation to the pointer so that thereafter no attention may be paid to the graduations on the scale, it being merely necessary to see that when the cup is filled with the plastic material the pointer of the weighing device is caused to move to the indicator.

And a further object is to provide a weighing device of this character in which the tension of the spring supporting the platform is immaterial, wherein the weight of the cup containing the plastic matrix is immaterial, and wherein in brief the point to be attained by the pointer of the weighing device is set each day so as to free the machine from any possible chance results, due to weakening of the spring and diminution in its tension, carelessness of the operator, etc.

Other objects will appear in the course of the following description.

My invention is illustrated in the accompanying drawings, wherein:—

Fig. 1 is a side elevation of a weighing scale embodying my invention.

Fig. 2 is a face view of a test chart or overrun controller chart designed to be used with the weighing scale.

Fig. 3 is an elevation partly in section of the test cup.

Fig. 4 is a plan view of a series of weights designed to be used with the weighing scale.

Referring to these drawings, 10 designates a base, upon which is mounted the standard 11 supporting a coil spring 12. Supported upon this spring for vertical movement is a tubular member 13, within which the spring is disposed, this tubular member supporting a platform 14. The spring is carried at its upper end by means of an arm 15 extending out from the standard 11 and through a slot in the tubular member 13.

Extending upward from the base 10 is a scale 16 which may be provided with graduations 17 upon its arcuate margin. A pointer 18 is pivoted at 19 upon the standard, the short arm 20 of the pointer being operatively pivoted to the tubular member 13. Thus it will be obvious that when a weight is disposed upon the platform 14, the platform and tubular member will descend and the outer end of the pointer will move upward over the graduations 17.

Mounted upon the graduated margin of the scale 16 are one or more sliding index members or markers, shown as two in number, and designated 21 and 22. These index members are slidable along the arcuate edge of the scale and may be held in any desired position, as by set screws. Only one index member 21 need be used but preferably two index members 21 and 22 are used to fix the maximum and minimum limits of weights or the maximum and minimum limits of the position to which the pointer should move under a certain predetermined weight.

Co-acting with the scale is an aluminum cup 23 of predetermined capacity, and used with this cup are a series of weights 24, these weights preferably running from 145½ grams to 240½ grams. Used in connection with the weighing device is a card, scale or chart, designated 25, a portion of which chart is illustrated. This chart has on it a column 26 indicating per cent of overrun desired, a transverse series of figures designated 27 indicating the weight of the mix before being aerated in pounds per gallon, and extending vertically downward from these series of figures 27 are columns 28 containing figures indicating the weight in grams which a predetermined quantity of the mix should weigh after being aerated to secure from a mix or matrix having a certain weight per gallon the percentage of overrun desired which is shown in the column 26. This matter is more fully developed and described in my co-pending application for patent filed of even date herewith.

In the use of this device, I will assume that it is being used in the manufacture of ice cream and that the operator who is freezing the cream desires to draw his ice cream from the freezer at a definite overrun percentage, that is to say, he desires that 100 gallons of plastic mix shall make 190 gallons of ice cream. His percentage of desired overrun or yield is then 90. If now he is freezing the mixture, which before aeration or beating weighs 9 pounds to the gallon, then by consulting the card 25, at the intersection of the column 28 which is headed by the figures 9.0 with 90 in the column 26, he will find the figures 185½, which shows him that the aluminum test cup 23, when filled with ice cream, should weigh 185½ grams in order for him to secure the overrun he desires. Accordingly he places the cup 23 upon the platform of the weighing device and places therein weights 24 to the extent of 185½ grams. The pointer 18 will then move over the scale 16 and come to rest at a certain point thereon. The index member 21 is then moved so as to mark the location of this point fixed. Thereafter when the cup 23 is filled with ice cream and placed upon the platform 14, it should move the pointer into coincidence with the index member 21. If the cup filled with ice cream deflects the pointer 18 beyond the index marker 21, then it follows that the ice cream is too heavy in weight and needs additional beating to reduce its weight. If the pointer is deflected to a point below the index 21, then it indicates that the test cup contains an ice cream too light and the occluded gases need to be beaten out until the ice cream in the test cup deflects the pointer to the point required.

By providing an additional index marker 22, maximum and minimum limits of weight may be indicated to which the freezer operator must adhere. In other words, if the manufacturer determines he shall draw his ice cream with not less than 90% overrun and not more than 100% overrun from a 9-pound mix, the adjustable markers 21 and 22 or indices are set to correspond with 185½ grams and 176½ grams respectively, and the freezing operator must keep within this range.

I have described this device as being used with reference to ice cream, as this illustrates the manner of use of the device, but it will be understood that it may be used wherever it is desired to note that an article should have a predetermined weight. In other words, the weighing device is designed to be used as a means for indicating that a certain weight has been attained or not attained by a certain article. In other weighing scales all the loci are etched out or cut in the form of graduations upon the scale and the weight of the article is indicated by reading the position of the pointer with reference to this scale. Such devices are open to the objection that they cannot be accurate when anything is wrong with the scale. By my device absolute accuracy can always be attained. The tension of the spring is entirely immaterial, the weight of the cup 23 is immaterial, and the device is immune from the stupidity of the operator. The weighing device may be changed in sensitiveness from day to day but it makes no difference, for the reason that the exact locus of the marker 21 is set each day and thereafter it is only necessary to see that the pointer attains this locus in order to secure a standard product. This idea of setting the exact locus for the pointer daily frees the machine from chance results or any uncertainty.

By the use of this weighing device, I have provided a very simple means whereby the variation from known specific gravity due to the introduction into a matrix of a certain disturbing element, such as occluded bubbles of gas, may be measured, and this is of particular importance in the manufacture of food products where it is particularly necessary not to get too much or too little occluded gas in the product.

I claim:

1. A weighing device of the character described comprising a base, a supporting standard, a depending contractile spring supported by the upper end of the standard, a tubular member with which the lower end of the spring is engaged and by which it is supported, a platform carried by the tubular member, a pointer pivoted to the standard and operatively connected to the tubular member to be shifted thereby, a scale mounted upon the base and over which the pointer moves, and a marker adjustable upon the scale when acted upon by a certain definite amount of material disposed on the platform.

2. A weighing device of the character described comprising a spring supported weighing platform, a pointer operatively connected thereto to be deflected thereby, a scale over which the pointer moves, a marker adjustable along the scale and adapted to be held in its adjusted position whereby a predetermined position of the pointer under the action of a predetermined weight may be indicated for future reference, a cup of known cubic capacity, a series of weights adapted to be disposed within the cup, and a chart having thereon a column of figures denoting percentage of overrun desired, a transverse line of figures denoting the weight of mix in units of weights per a predetermined cubic measure, and a series of columns beneath the several weight figures giving the weights of a predetermined quantity of the mix sufficient to fill said cup.

WILFRID P. HEATH.